United States Patent [19]

Geiger

[11] 4,190,201
[45] Feb. 26, 1980

[54] MISTING CONTROL

[76] Inventor: Edward C. Geiger, 500 E. 7th St., Lansdale, Pa. 19446

[21] Appl. No.: 944,965

[22] Filed: Sep. 22, 1978

[51] Int. Cl.² .......................................... A01G 25/16
[52] U.S. Cl. ...................................... 239/65; 47/48.5; 74/609; 403/197
[58] Field of Search ................. 137/403; 239/63–65, 239/67; 222/56; 47/1 R, 48.5; 301/108 R, 108 A, 108 S, 108 TW, 109, 5.3, 5.7; 308/26; 403/194, 195, 197, 201; 74/543, 594.1, 609, 579 R

[56] References Cited

U.S. PATENT DOCUMENTS

| 511,075 | 12/1893 | Franke | 239/65 X |
| 2,253,708 | 8/1941 | Holman | 301/108 R X |
| 2,775,205 | 12/1956 | Gunther | 137/403 X |
| 2,969,185 | 1/1961 | Geiger | 239/63 |
| 2,969,186 | 1/1961 | Geiger | 239/65 |

Primary Examiner—Robert B. Reeves
Assistant Examiner—Andres Kashnikow
Attorney, Agent, or Firm—Dann, Dorfman, Herrell and Skillman

[57] ABSTRACT

Water, in the form of a mist, is delivered to cutting beds and the like through a plurality of nozzles attached to one or more pipes in which the flow of water is controlled by a valve, the opening and closing of which is regulated by a control device which operates in response to the atmospheric condition surrounding the cutting beds. The control device is provided with a liquid collecting-and sensing element, the movement of which actuates an electrical switch, which, in turn, activates and deactivates the circuit regulating the flow of water to the misting system. The control device is of simple construction, yet operates in a completely consistent and reliable manner.

1 Claim, 3 Drawing Figures

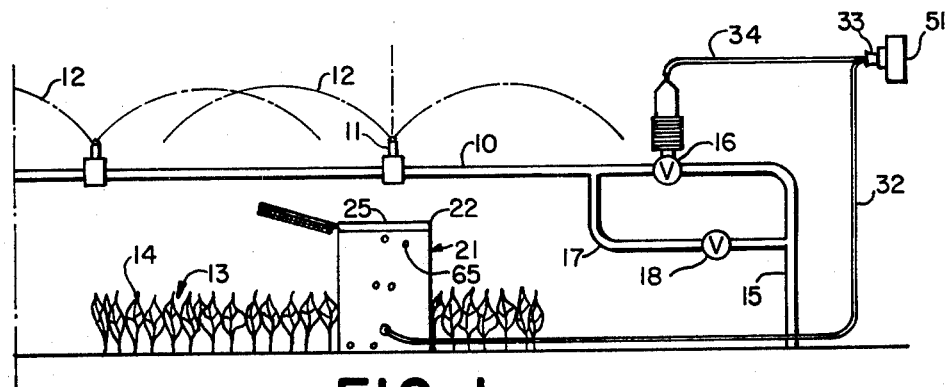
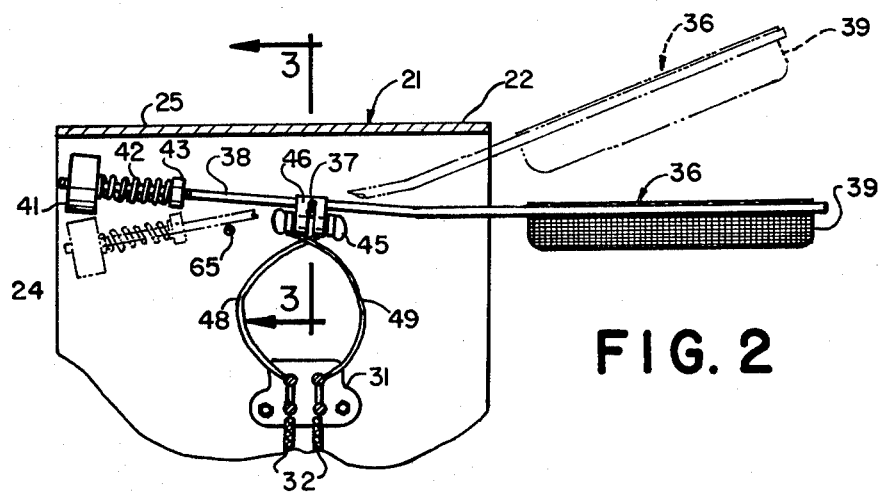
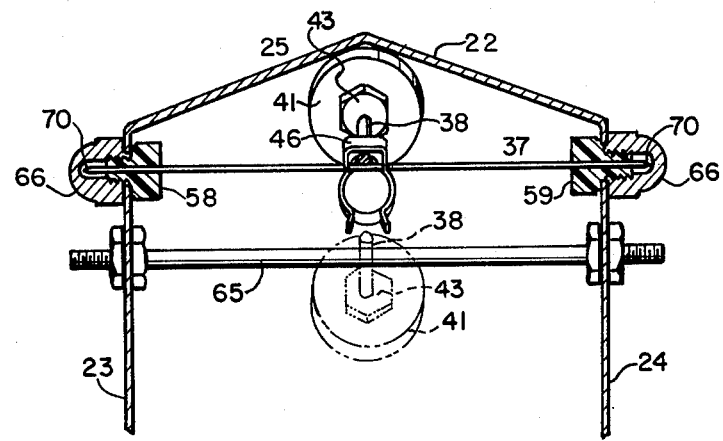

MISTING CONTROL

The present invention relates to improvements for a control device for a misting system of the type disclosed and claimed in U.S. Pat. No. 2,969,186. As pointed out therein, prior art automatic misting systems have not proved to be entirely satisfactory because of an inability to properly control the cycle or timing interval of the misting operation. For example, in U.S. Pat. No. 2,969,185, I have disclosed an automatic misting system in which electrically conductive electrodes are mounted to collect the mist emanating from the misting nozzles of the system. When the collection is sufficient to complete the circuit including the collecting electrodes, the misting operation is interrupted until such time as the water on the collecting electrodes evaporates to an extent interrupting the electrical curcuits. Thus, the misting period of the system is controlled in accordance with the humidity of the air surrounding the cutting bed since in more humid weather, a longer period is required to evaporate the water on the collectors whereas in dryer weather the misting recurs more rapidly due to the rapid evaporation of moisture from the collectors. This system is not completely reliable in areas where the normal water supply or other liquid being sprayed is not sufficiently conductive to complete the electrical circuit and where it may be dangerous to have even low voltage electrodes exposed.

An alternative to the foregoing system is one controlled by a timer. The result of using the timed misting systems of the prior art is that either too much water is delivered to the plants which promotes disease and wastes water, or the plants receive too little water which causes the leaves of the plants to wilt, and retards rooting.

Although the misting system disclosed in U.S. Pat. No. 2,969,186 has achieved the objects set forth therein, namely, responsiveness to atmospheric conditions existing in the cutting beds without requiring the use of expensive control devices, even its performance has not been completely satisfactory due to inconsistent and erratic operation. The problem has been most often manifested in the cutting beds receiving too much water. Thus, there remains an unfulfilled need in the art for a misting system capable of reliably maintaining a desirable moisture level in the cutting beds of young plants.

Accordingly, a primary object of the present invention is to provide an improved misting system responsive to the condition of the atmosphere surrounding the cutting beds and which is devoid of timers and other expensive control devices, yet operates in a completely reliable and consistent manner.

Another object of the present invention is to provide an improved misting control device which operates reliably regardless of the conductivity of the water or other liquid being sprayed.

Still another object of the present invention is to provide an electrically-controlled misting system wherein the electrical elements are fully protected against damage.

The foregoing objects have been achieved by modifying the structure of the misting system control device disclosed in U.S. Pat. No. 2,969,186 to insure free movement of its collecting-and-sensing element, which activates or deactivates the circuit controlling the delivery of water to the misting system, depending on the relative weight of water or other liquid accumulated on the collecting-and-sensing element. As a result of these modifications, inconsistent and erratic operation of the misting system has been eliminated.

The improved control device, as well as the overall misting system, will be described more fully hereinafter with reference to the accompanying drawings, wherein:

FIG. 1 is a fragmentary view in side elevation of a misting system in accordance with the present invention;

FIG. 2 is an enlarged fragmentary transverse sectional view of the unit shown in FIG. 1; and FIG. 3 is a sectional view taken on line 3—3 of FIG. 2.

By way of background the misting system disclosed in U.S. Pat. No. 2,969,186 is similar to the system illustrated in FIG. 1, comprising a spray pipe 10 having a plurality of misting nozzles 11 connected thereto and operable to direct an umbrella of mist, as indicated at 12, over a cutting bed 13. The spray pipe 10 is mounted at a sufficient distance above the foliage of the cuttings 14 to preclude interference of the pipe 10 with the cuttings. The spray pipe 10 is connected to a liquid supply pipe 15 by a solenoid valve 16 and a bypass 17 having a manually-controlled valve 18 therein. The valve 18 is normally closed and is opened only when it is desired to manually control the misting due to failure of the electric supply or for other purposes.

The opening and closing of the solenoid 16 is controlled automatically in accordance with the requirements of the cutting bed as determined by the prevailing atmospheric conditions. To this end a sensing-and-control device is positioned in the bed 13 in the path of the umbrella of mist 12 supplied by one of the misting nozzles 11. The control device is provided with a liquid collecting-and-sensing element 36. The movement of the collecting-and-sensing element, actuates electrical switching means 45, in the present instance a mercury switch mounted on the element by a holder 46. The switch means 45 activates and deactivates the circuit which controls the operation of the solenoid valve 16, thus regulating the flow of water to the misting system. The circuit may be connected to any suitable energy source, for example, to a standard outlet box 51. The collecting-and-sensing element is in the "on" or "off" position depending on the relative weight of liquid accumulated thereon.

In a preferred embodiment of the present invention, as shown in FIGS. 2 and 3, the control device 21 comprises a housing 22 having opposed sidewalls 23 and 24, respectively, and a peaked roof 25. The collecting-and-sensing element 36 is pivotally supported by an axle 37 journalled in bushings 58 and 59 in the sidewalls 23 and 24. Extending perpendicularly to the axle 37 is balance rod 38 which may be integrally attached to the axle 37. Mounted at one end of balance rod 38 is a screen element 39. The screen element is nonabsorbent and may be on the order of a 50 mesh to collect water, due to the surface tension of the liquid which forms a thin film over the screen. The screen element has a pair of flat faces which decline outwardly from the balance rod 38 so that they shed any accumulation of water which might otherwise affect the control. In this manner, only a thin film of water is collected by the collector 39.

At the opposite end of the balance rod 38, a counterweight 41 is threadedly engaged on the rod 38 and is locked in position by a friction spring 42 and lock nut 43. The position of counterweight 41 may be adjusted on the rod to maintain the desired moisture level in the cutting beds.

When the atmosphere in the cutting beds is relatively dry, the water on the collector 39 gradually evaporates and, due to the weight of the counterweight 41, the collecting-and-sensing element 36 assumes the position shown in broken lines in FIG. 2. The switch 45 completes the electrical circuit which controls the operation of solenoid 16, whereupon the solenoid valve opens to deliver a mist of water to the beds. During the misting operation, the collector 39 accumulates a film of water until the weight of the water overcomes the weight of the counterweight 41 and pivots the collecting-and-sensing element 36 on the axle 37 to the position shown in full lines in FIG. 2. Pivotal movement of the rod 38 tilts the mercury switch 45 to the open position and deenergizes the solenoid valve to close off the supply of water. The collecting-and-sensing element remains in the latter position until the atmosphere in the bed causes the liquid on collector 39 to evaporate, at which time the misting cycle begins again.

The movement of collecting-and-sensing element 36 actuates the mercury switch 45, which, in turn, activates and deactivates the valve 16 regulating the flow of water to the misting system. The switch is mounted on the balance rod 38, for example, by a clip holder 46, preferably positioned on the rod 38, at its junction with the axle 37. In the present instance, the holder 46 centers the mercury switch 45 under the axle 37 so that the mercury in the switch cooperates with the collector 39 and counterweight 41 to overbalance the balance arm 38 in its proper position. Thus, the mercury switch not only serves its function as a switch, but also serves the function of an over-center device.

The mercury switch 45 is connected by a pair of leads 48 and 49 to a terminal block 31 mounted on sidewall 24. The leads are arranged as shown in FIG. 2 to minimize their effect upon the balance of the rod 38. The leads 48 and 49 are relatively flexible and are crossed immediately adjacent the mercury switch 45 underlying the pivotal axle 37 so that they do not have any substantial effect on the balance of the rod 38. The terminal block 31 is connected to the outlet box 51 through a two-wire cord 32 which is provided with a plug 33. A second two-wire cord connects solenoid valve 16 with outlet box 51. One wire of the cord 32 is connected to one of the prongs of the plug 33, and the other wire is connected to one of the wires of the cord 34, the other wire of cord 34 being connected to the other prong of the plug 33.

The roof 25 serves as a limit stop to the clockwise movement of the balance rod 38, as seen in FIG. 2. The first or clockwise limit position of the balance rod 38 is determined by the engagement of the counterbalance 41 with the roof 25 so that the rod assumes the clockwise limit position as shown in FIG. 2 wherein the top of the collector 39 is substantially horizontal. The disposition of the collector insures a uniform film of water over the entire collector when it is in its clockwise limit position, and by providing a uniform film of water, the evaporation over the entire surface is uniform and the unit exhibits the proper sensitivity.

In accordance with the present invention, certain modifications have been made to the control unit disclosed in U.S. Pat. No. 2,969,186 which have been discovered to overcome the aforementioned problems of inconsistent and erratic performance in the operation thereof. As shown in FIGS. 2 and 3, a stop means 65 has been provided laterally within the housing so that when the water on collecting element 39 has evaporated, counterweight 41 causes balance rod 38 to rest upon stop means 65 thereby preventing contact between the balance rod and peaked roof 25. Thus as shown in FIG. 2, stop means 65, which in the present instance is simply a bar, establishes a second or counterclockwise limit position for balance rod 38 independently of the roof. In this position collecting element 36 is substantially dry and is positioned to collect water from the misting nozzles. The stop bar is positioned horizontally between the walls 23 and 24 parallel with axle 37 in order to avoid any tendency causing lateral displacement of the collecting-and-sensing element.

As a result of the modification just described, the reliability of operation of the misting system has been markedly improved. In retrospect, it is surmised that as water accumulated on the collecting element of the control unit disclosed in U.S. Pat. No. 2,969,186 a droplet of water frequently was formed at the point of contact between the balance rod and the peaked roof which, due to the surface tension of the droplet, hindered the clockwise movement of the balance rod, with an attendant delay in the termination of the supply of water to the misting system. By limiting counterclockwise movement of balance rod 38 with the stopping bar 65, and thereby preventing contact between balance rod 38 and peaked roof 25, potentially hindering droplets cannot form while the film of water accumulates on collecting element 36 and the possibility of erratic operation of the control unit is substantially reduced.

In addition, axle 37 has been provided with pointed ends 70 which cooperate with the interior surfaces of cap screws 66 to minimize friction in the pivotal movement of the axle 37. As illustrated in FIG. 3, the cap screws 66 are threadedly engaged on bushings 58 and 59 mounted in the sidewalls 23 and 24 of housing 22. The bushings are made of a non-corrosive material, preferably nylon, to insure facile pivotal movement of the axle during long-term service.

As a result of the foregoing modifications, the major contributing factors believed responsible for the control unit's past erratic performance have been eliminated. Thus, control units constructed in accordance with the present invention operate in an effective, efficient, and completely consistent manner.

As was the case with the control unit disclosed in U.S. Pat. No. 2,969,186, the solenoid of the valve 16 may be connected directly to a standard outlet box 51 by simply plugging in the plug 33 without the necessity for relays or other expensive voltage reduction devices, the mercury switch 45 being able to accommodate the normal line voltage used to operate the solenoid valve 16.

Furthermore, the enclosure formed by the casing 22 protects the operating parts of the unit against damage by water. To further insure against damage, it is preferred to fabricate all of the exposed parts of the unit out of stainless steel or similar noncorrosive material. The enclosure also prevents water droplets from accumulating on the operating parts, which would adversely affect the precise balance and accurate control provided by the present invention. The roof 25 not only protects the mercury switch 45, the axle 37 and the counterweight 41 from the effect of moisture, but also protects the same against damage should foreign particles be dropped thereon, for example, during the cultivating of the seed bed 13.

While a particular embodiment of the present invention has been illustrated and described herein, it is not intended to limit the invention to such a disclosure. Changes and modifications may be made therein and thereto within the scope of the following claims.

I claim:

1. In an automatic misting system for cutting beds or the like having at least one misting nozzle operable upon a supply of liquid thereto to direct a mist of spray over said bed, and a valve to control the supply of spray liquid to said nozzle; an automatic control means to operate said valve comprising a housing having a pair of spaced-apart sidewalls and a peaked roof, corrosion-resistant bushings mounted on said sidewalls opposite one another, said bushings having a portion extending through said sidewalls and caps engaging said extending portion, a non-absorbent collector positioned in the atmosphere above the bed and in the path of the mist from the spray nozzle to collect thereon a film of water of a thickness determined by the surface tension thereof, a collecting-and-sensing element comprising a balance rod underlying said roof, a support for said balance rod, said balance rod being integrally attached to said support, said support having pointed ends which are pivotally mounted in said bushings and which cooperate with said caps to minimize friction in the pivotal movement of said support, said collector being mounted at one end of said balance rod, and a counterweight mounted on the opposite end of said balance rod to overcome the weight of said collector when it is dry, but of insufficient weight to overcome the weight of said collector when it is provided with a film of liquid thereon, said counterweight being positioned within said housing and operable upon overbalance thereof by said collector with its film of water to cause the collecting-and-sensing element to assume a first limit position wherein the counterweight is engaged against said roof to limit the pivotal movement thereof in one direction, opposed stopping means positioned within said housing to limit pivotal movement of said collecting-and-sensing element in the other direction, said stopping means being a rod laterally disposed within said housing and disposed substantially horizontally parallel with said balance rod support, whereby said balance rod, when said counterweight overcomers the weight of said dry collector, contacts said stopping means causing said collecting-and-sensing element to assume a second limit position, wherein said housing and said balance rod are out of contact and remain so while said film of water accumulates on said collector, and a switch means responsive to the position of said collecting-and-sensing element and connected to said valve to supply water to said nozzle in the second position of said collecting-and-sensing element and to interrupt said supply in the first position of said collecting-and-sensing element.

* * * * *